(12) United States Patent
Yu et al.

(10) Patent No.: US 10,320,693 B2
(45) Date of Patent: Jun. 11, 2019

(54) METHOD FOR PACKET DATA CONVERGENCE PROTOCOL COUNT SYNCHRONIZATION

(71) Applicant: QUALCOMM Incorporated, San Diego, CA (US)

(72) Inventors: Yu-Ting Yu, Union City, CA (US); Gavin Bernard Horn, La Jolla, CA (US); Shailesh Maheshwari, San Diego, CA (US); Vanitha Kumar, San Diego, CA (US); Gang Andy Xiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 15/621,321

(22) Filed: Jun. 13, 2017

(65) Prior Publication Data

US 2018/0013685 A1 Jan. 11, 2018

Related U.S. Application Data

(60) Provisional application No. 62/359,135, filed on Jul. 6, 2016.

(51) Int. Cl.
| | |
|---|---|
| *H04L 12/801* | (2013.01) |
| *H04L 12/26* | (2006.01) |
| *H04W 12/04* | (2009.01) |
| *H04L 12/24* | (2006.01) |
| *H04M 7/00* | (2006.01) |
| *H04W 80/02* | (2009.01) |

(52) U.S. Cl.
CPC ............ *H04L 47/34* (2013.01); *H04L 43/022* (2013.01); *H04L 43/0829* (2013.01); *H04L 43/106* (2013.01); *H04W 12/04* (2013.01); *H04L 41/5003* (2013.01); *H04L 43/0852* (2013.01); *H04M 7/0084* (2013.01); *H04W 80/02* (2013.01)

(58) Field of Classification Search
CPC . H04L 41/5003; H04L 47/34; H04L 43/0829; H04L 43/022; H04L 43/106; H04L 43/0852; H04W 12/04; H04W 80/02; H04M 7/0084
USPC .......................................................... 370/329
See application file for complete search history.

(56) References Cited

U.S. PATENT DOCUMENTS

| | | | |
|---|---|---|---|
| 2007/0258591 A1* | 11/2007 | Terry ..................... | H04L 1/187 380/247 |
| 2008/0123655 A1* | 5/2008 | Kim ...................... | H04L 1/1867 370/394 |

(Continued)

OTHER PUBLICATIONS

International Search Report and Written Opinion—PCT/US2017/037526—ISA/EPO—dated Sep. 12, 2017.

*Primary Examiner* — Peter P Chau
(74) *Attorney, Agent, or Firm* — Loza & Loza, LLP

(57) ABSTRACT

Aspects of the present disclosure provide mechanisms for count synchronization in a wireless communication network. A respective count value may be maintained for each packet transmitted over a wireless connection, where each count value includes a respective hyper frame number and a respective sequence number. To synchronize a current count value associated with a current packet, a count synchronization may be initiated to transmit at least a current hyper frame number of the current count value over the wireless connection.

24 Claims, 16 Drawing Sheets

(56) References Cited

U.S. PATENT DOCUMENTS

| | | | |
|---|---|---|---|
| 2010/0118856 A1* | 5/2010 | Krishnamurthy | H04L 1/0026 370/342 |
| 2010/0232356 A1* | 9/2010 | Maheshwari | H04L 1/1867 370/328 |
| 2012/0099525 A1* | 4/2012 | Maheshwari | H04L 63/068 370/328 |
| 2014/0112157 A1* | 4/2014 | Han | H04L 69/22 370/242 |

\* cited by examiner

METHOD FOR PACKET DATA CONVERGENCE PROTOCOL COUNT SYNCHRONIZATION

PRIORITY CLAIM

This application claims priority to and the benefit of Provisional Patent Application No. 62/359,135 filed in the U.S. Patent and Trademark Office on Jul. 6, 2016, the entire content of which is incorporated herein by reference as if fully set forth below in its entirety and for all applicable purposes.

TECHNICAL FIELD

The technology discussed below relates generally to wireless communication systems, and more particularly, to Packet Data Convergence Protocol (PDCP) COUNT synchronization. Embodiments can provide techniques for initiating COUNT synchronization in-band or out-of-band.

INTRODUCTION

In 3rd Generation Partnership Project (3GPP) standards, the Packet Data Convergence Protocol (PDCP) sublayer is located in the radio protocol stack in both the Universal Mobile Telecommunications System (UMTS) and Long Term Evolution (LTE) air interface on top of the Radio Link Control (RLC) sublayer. The PDCP sublayer provides various services, such as transfer of user and control plane data, header compression, ciphering, and integrity protection. The ciphering and deciphering of packets are based on the packet COUNT value in the PDCP header. For example, a packet may be ciphered using a COUNT value generated by the transmitting side PDCP and deciphered using a COUNT value expected by a receiving side.

Thus, in order to correctly decipher the packet at the receiver side, the transmitter and receiver must maintain an accurate record of the COUNT value associated with each packet. In principle, the COUNT value is not reused during a session, and therefore the COUNT space is long, e.g., 32 bits in LTE. However, in LTE, for example, the transmitter and the receiver communicate the COUNT value of a packet by including only part of the COUNT value corresponding to the sequence number of a packet in the PDCP header in order to reduce overhead. The sequence number (SN) has a smaller space, e.g. 7 bits or 12 bits. The transmitter and receiver also locally maintain a hyper frame number (HFN), which is incremented by 1 each time the SN wraps around. The COUNT value of a packet may thus be inferred by concatenating the locally maintained HFN with the SN received in the packet.

HFNs at both the transmitter and receiver are normally in sync for high data rate applications due to the protection provided by the RLC Acknowledged Mode (AM), requiring an Acknowledged/Not Acknowledged (ACK/NACK) from the receiver for every transmission. However, in next generation (e.g., 5G) networks, the RLC Unacknowledged Mode (UM) may be utilized with high data rate applications on dual connectivity devices for better performance and lower device cost. Therefore, there is a potential risk of losing HFN synchronization between the transmitter and the receiver. For example, when an undetected SN error occurs at the receiver side or the number of lost RLC UM packet data units (PDUs) exceeds the UM SN space, the transmitter and receiver HFNs may become out-of-sync. When HFN de-synchronization occurs, the receiver may incorrectly decipher the packet, resulting in data loss.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for count synchronization in a wireless communication network. A respective count value may be maintained for each packet transmitted over a wireless connection, where each count value includes a respective hyper frame number and a respective sequence number. To synchronize a current count value associated with a current packet, a count synchronization process may be initiated to transmit at least a current hyper frame number of the current count value over the wireless connection.

In one aspect of the disclosure, a method of count synchronization in a wireless communication network is provided. The method includes maintaining a respective count value for each packet transmitted over a wireless connection, where each count value includes a respective hyper frame number and a respective sequence number. The method further includes initiating a count synchronization of a current count value, where the current count value corresponds to the respective count value of a current packet, and transmitting at least a current hyper frame number of the current count value over the wireless connection to synchronize the current count value.

Another aspect of the disclosure provides an apparatus configured for count synchronization in a wireless communication network. The apparatus includes a processor, a memory communicatively coupled to the processor, and a transceiver communicatively coupled to the processor. The processor is configured to maintain a respective count value for each packet transmitted over a wireless connection, where each count value includes a respective hyper frame number and a respective sequence number. The processor is further configured to initiate a count synchronization of a current count value, where the current count value corresponds to the respective count value of a current packet, and transmit at least a current hyper frame number of the current count value over the wireless connection to synchronize the current count value.

Another aspect of the disclosure provides an apparatus configured for count synchronization in a wireless communication network. The apparatus includes means for maintaining a respective count value for each packet transmitted over a wireless connection, where each count value includes a respective hyper frame number and a respective sequence number. The apparatus further includes means for initiating a count synchronization of a current count value, where the current count value corresponds to the respective count value of a current packet, and means for transmitting at least a current hyper frame number of the current count value over the wireless connection to synchronize the current count value.

Examples of additional aspects of the disclosure follow. In some aspects of the present disclosure, the current packet is received for transmission over the wireless connection. In some examples, a full count value is included in a header of the current packet in response to initiating the count synchronization, where the full count value includes the current hyper frame number and a current sequence number. The current packet including the full count value in the header may then be transmitted over the wireless connection. An indication that the current packet includes the full count value may also be included in the current packet. In some examples, the header may include a Packet Data Convergence Protocol (PDCP) header, a Radio Link Control (RLC) header, or a Media Access Control (MAC) header.

In some aspects of the present disclosure, the current packet may include a short count value in a header thereof, where the short count value includes only a current sequence number. In some aspects of the present disclosure, the current hyper frame number and a current sequence number of the current count value may be transmitted over the wireless connection to synchronize the current count value.

In some aspects of the present disclosure, an out-of-sync flag may be received over the wireless connection in response to transmitting at least the current hyper frame number of the current count value. In response to receiving the out-of-sync flag, data transmission and reception may be suspended over the wireless connection, a new hyper frame number may be transmitted over the wireless connection to synchronize the current count value, and data transmission and reception may then be resumed over the wireless connection. In some examples, the new hyper frame number exceeds the current hyper frame number. In some examples, a hyper frame number synchronization complete indication may be received over the wireless connection prior to resuming data transmission and reception.

In some aspects of the present disclosure, at least the current hyper frame number of the current count value may be transmitted within a control message. In some examples, the control message includes a Radio Resource Control (RRC) message, a Packet Data Convergence Protocol (PDCP) HFN packet data unit (PDU), a Radio Link Control (RLC) HFN PDU, or a Media Access Control (MAC) Control Element (CE). In some examples, an integrity protection signature may also be included within the PDCP HFN PDU, the RLC HFN PDU or the MAC CE including the current hyper frame number. In some examples, a control PDU sequence number may also be included within the PDCP HFN PDU, the RLC HFN PDU or the MAC CE including the current hyper frame number to enable retransmission and ciphering of the control message.

In some aspects of the present disclosure, the count synchronization may be initiated based on a number of packets transmitted after a previous count synchronization, upon expiration of a timer, in response to a fade event, or in response to a packet loss event. In some examples, a counter may be initialized in response to the previous count synchronization to count transmitted packets, and the count synchronization may be initiated when the counter reaches a predetermined number of the transmitted packets. In some examples, the timer may be initialized in response to the previous count synchronization. In some examples, the count synchronization may be triggered in response to determining a signal-to-noise ratio has dropped below a threshold. In some examples, the count synchronization may be triggered in response to determining a number of lost packets exceeds a threshold.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
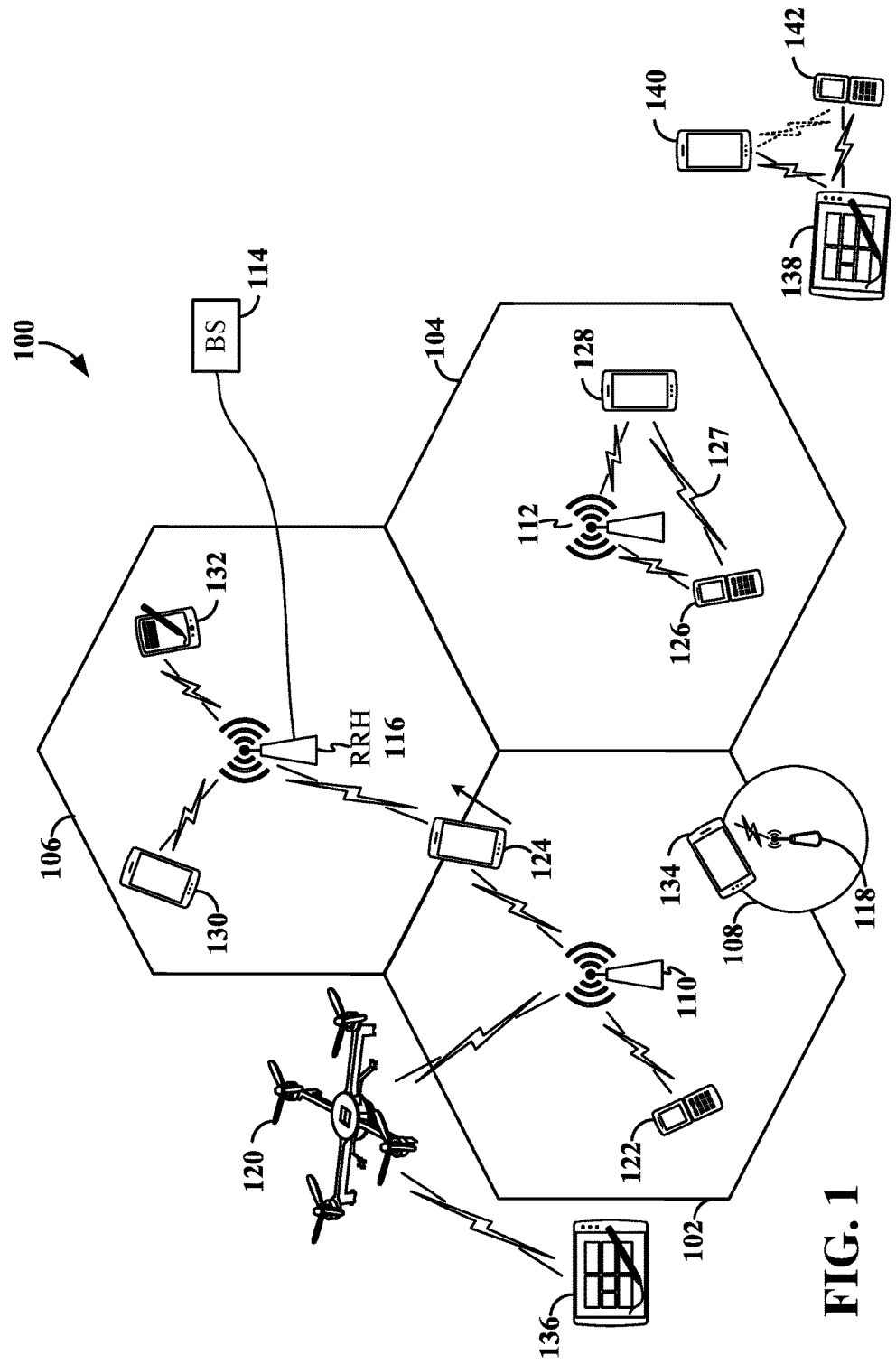
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a simplified schematic illustration of a radio access network 100 is provided. The radio access network 100 may be a legacy access network or a next generation access network. In addition, one or more nodes in the radio access network 100 may be next generation nodes or legacy nodes.

As used herein, the term legacy access network refers to an access network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network refers to an access network employing a fifth generation (5G) wireless communication technology based on a set of standards that complies with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. One example of a next generation access network is the New Radio (NR) access network.

The geographic region covered by the radio access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNodeB (gNB) or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information (e.g., user data traffic) from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, mini-slots and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A mini-slot may carry less than 7 OFDM symbols or less than 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), discrete Fourier transform (DFT)-spread OFDMA or single-carrier FDMA (DFT-s-OFDMA or SC-FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe/slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
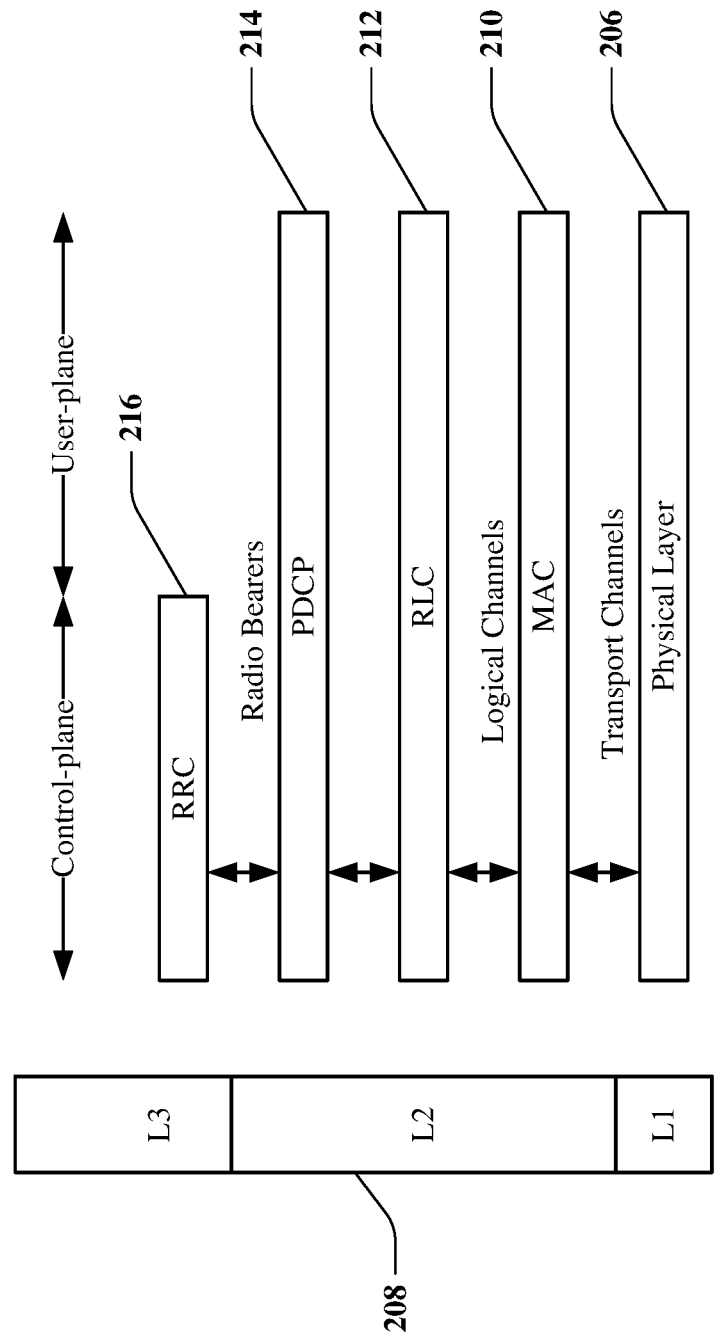
FIG. 2 is a diagram illustrating an example of a radio protocol architecture for the user and control plane.

The radio protocol architecture for a radio access network, such as the radio access network 100 shown in FIG. 1, may take on various forms depending on the particular application. An example for an LTE radio access network will now be presented with reference to FIG. 2. FIG. 2 is a conceptual diagram illustrating an example of the radio protocol architecture for the user and control planes.

As illustrated in FIG. 2, the radio protocol architecture for the UE and the eNB includes three layers: Layer 1, Layer 2, and Layer 3. Layer 1 is the lowest layer and implements various physical layer signal processing functions. Layer 1 will be referred to herein as the physical layer 206. Layer 2 (L2 layer) 208 is above the physical layer 206 and is responsible for the link between the UE and eNB over the physical layer 206.

In the user plane, the L2 layer 208 includes a media access control (MAC) sublayer 210, a radio link control (RLC) sublayer 212, and a packet data convergence protocol (PDCP) 214 sublayer, which are terminated at the eNB on the network side. Although not shown, the UE may have several upper layers above the L2 layer 208 including a network layer (e.g., IP layer) that is terminated at the Packet Data Network (PDN) gateway on the network side, and an application layer that is terminated at the other end of the connection (e.g., far end UE, server, etc.).

The PDCP sublayer 214 provides multiplexing between different radio bearers and logical channels. The PDCP sublayer 214 also provides header compression for upper layer data packets to reduce radio transmission overhead, security by ciphering the data packets, and handover support for UEs between eNBs. The RLC sublayer 212 provides segmentation and reassembly of upper layer data packets, retransmission of lost data packets, and reordering of data packets to compensate for out-of-order reception due to hybrid automatic repeat request (HARQ). The MAC sublayer 210 provides multiplexing between logical and transport channels. The MAC sublayer 210 is also responsible for allocating the various radio resources (e.g., resource blocks) in one cell among the UEs. The MAC sublayer 210 is also responsible for HARQ operations. The physical layer 206 is responsible for transmitting and receiving data on physical channels (e.g., within slots).

In the control plane, the radio protocol architecture for the UE and eNB is substantially the same for the physical layer 206 and the L2 layer 208 with the exception that there is no header compression function for the control plane. The control plane also includes a radio resource control (RRC) sublayer 216 in Layer 3. The RRC sublayer 216 is responsible for obtaining radio resources (i.e., radio bearers) and for configuring the lower layers using RRC signaling between the eNB and the UE.

In general, packets received by a sublayer from another sublayer may be referred to as Service Data Units (SDUs), while packets output from a sublayer to another sublayer may be referred to as Protocol Data Units (PDUs). For example, packets received by the PDCP sublayer 214 from an upper layer may be referred to as PDCP SDUs, and packets output from the PDCP sublayer 214 to the RLC sublayer may be referred to as PDCP PDUs or RLC SDUs.

Figure 3:
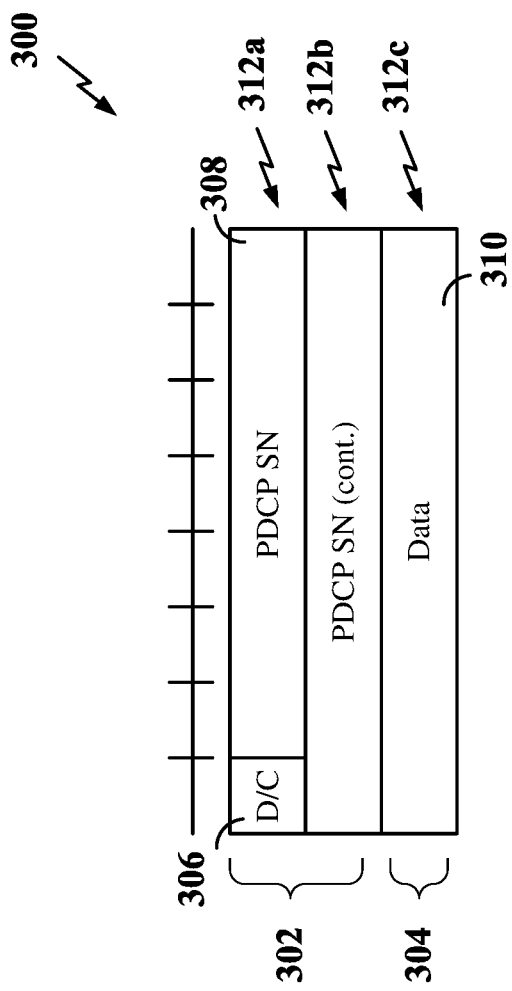
FIG. 3 is a diagram illustrating an example of a format of a Packet Data Convergence Protocol (PDCP) Packet Data Unit (PDU) in accordance with aspects of the disclosure.

An example of a PDCP packet data unit (PDU) format is illustrated in FIG. 3. The PDCP PDU format 300 includes a header 302 and body 304. The header 302 includes a D/C field 306 and SN field 308. The D/C field 306 is located within a first octet 312a and may include, for example, a single bit for indicating whether the PCDP PDU contains user plane data or control plane data. In the example shown in FIG. 3, the SN field 308 occupies the remainder of the first octet 312a, along with a second octet 312b. The SN field 308 contains the sequence number (SN) of the PDCP PDU. In some examples, the SN may contain 7 bits or 12 bits. The body 304 contains uncompressed or compressed user or control plane data 310 and may include one or more octets (only one of which octet 312c is shown for simplicity).

Figure 4:
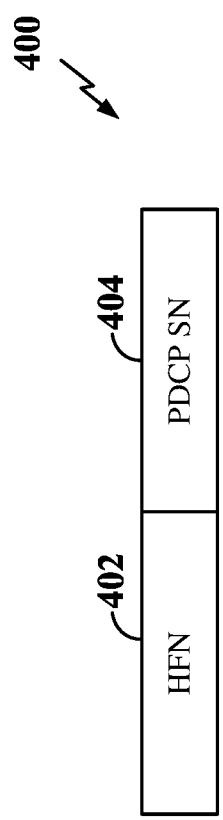
FIG. 4 is a diagram illustrating an example of a COUNT value in accordance with aspects of the disclosure.

In order to accurately cipher and decipher the PDCP PDU 300, both the transmitter and receiver involved in a session over a wireless connection must have knowledge of the full COUNT value. Referring now to FIG. 4, the COUNT value 400 includes a Hyper Frame Number (HFN) 402 and a Sequence Number (SN) 404. Since the COUNT value is not reused during a session, the COUNT space is long, e.g., 32 bits in LTE. However, as shown in FIG. 3, only the SN of the PDCP PDU is included in the PDCP header 302 in order to reduce overhead. The transmitter and receiver each locally maintain the HFN 402 and increment the HFN 402 by one each time the SN 404 wraps around. The COUNT value 400 of a PDCP PDU may thus be inferred or generated by concatenating the locally maintained HFN 402 with the SN 404 received in the SN field 308 of the PDCP header 302.

In various aspects of the disclosure, to ensure the HFNs 402 at both the transmitter and receiver are in sync, the transmitter may initiate or trigger a COUNT synchronization process. During count synchronization, the transmitter transmits the current HFN indicated or maintained locally on the transmitter to the receiver to enable the receiver to reset and/or synchronize the HFN locally on the receiver. In some examples, the HFN is transmitted together with the current SN. In some examples, the transmitter and receiver may each be embodied within a respective wireless communication device, such as a user equipment (UE), base station (eNB or gNB) or other device capable of communicating wirelessly with other devices.

Figure 5:
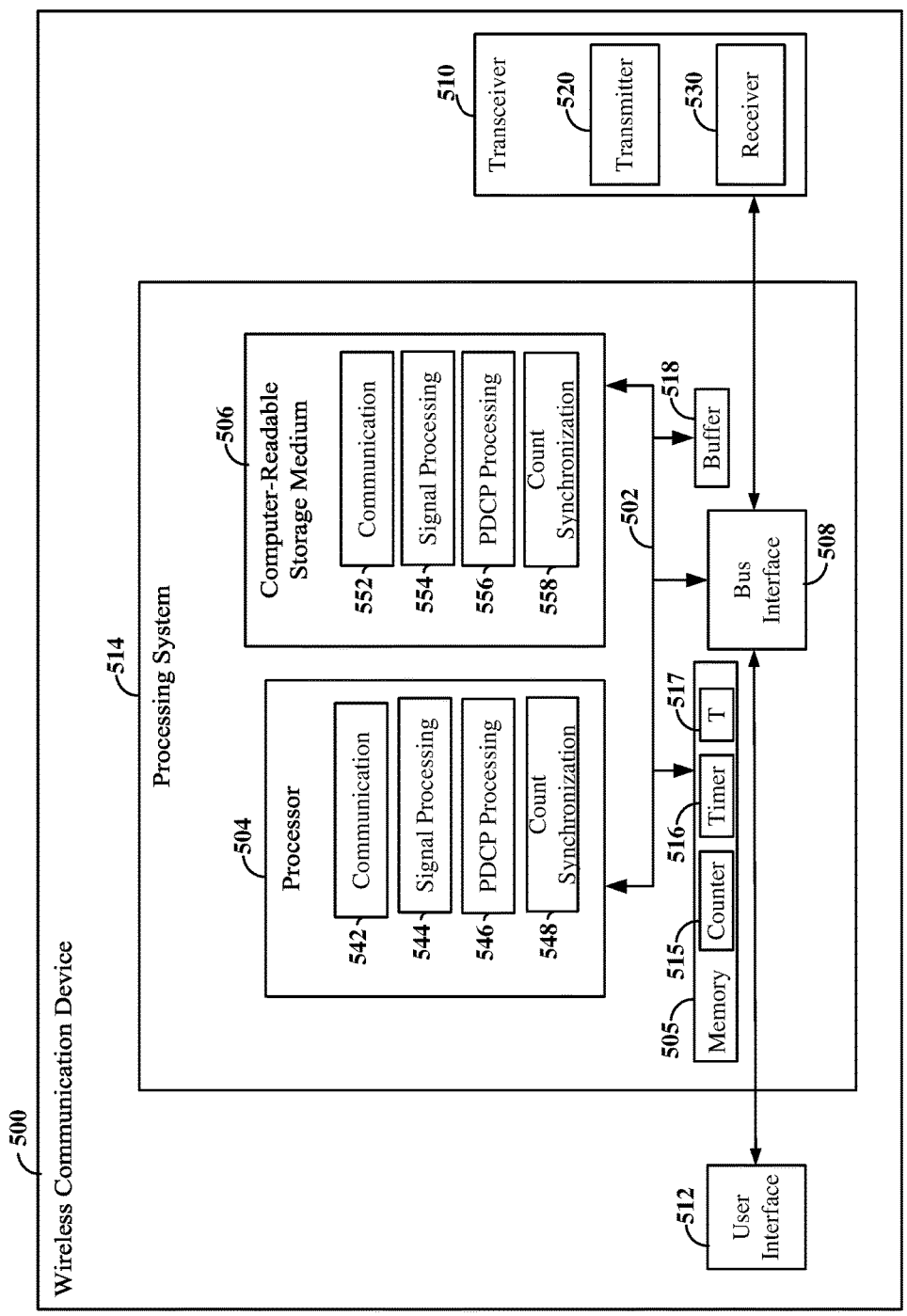
FIG. 5 is a block diagram illustrating an example of a hardware implementation for a wireless communication device employing a processing system, according to aspects of the disclosure.

FIG. 5 is a conceptual diagram illustrating an example of a hardware implementation for an exemplary wireless communication device 500 employing a processing system 514. For example, the wireless communication device 500 may be a user equipment (UE), a base station, or any other suitable apparatus or means for wireless communication.

The wireless communication device 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 500 may be configured to perform any one or more of the functions described herein. That is, the processor 504, as utilized in a wireless communication device 500, may be used to implement any one or more of the processes described below and illustrated in FIGS. 6-10.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium (e.g., air). For example, the transceiver 510 may include a transmitter 520 configured to transmit a signal (e.g., control and/or user data traffic) over a wireless connection to another wireless communication device and a receiver 530 configured to receive a signal (e.g., control and/or user data traffic) over the wireless connection from the other wireless communication device. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 504 may include circuitry configured for various functions. For example, the processor 504 may include communication circuitry 542. The communication circuitry 542 may include one or more hardware components that provide the physical structure that performs various processes related to wireless communication (e.g., signal reception and/or signal transmission) as described herein. The communication circuitry 542 may operate in coordination with communication software 552. The processor 504 may also include signal processing circuitry 544. The signal processing circuitry 544 may include one or more hardware components that provide the physical structure that performs various processes related to signal processing (e.g., processing a received signal and/or processing a signal for transmission) as described herein. The signal processing circuitry 544 may operate in coordination with signal processing software 554.

In various aspects of the disclosure, the processor 504 may further include PDCP processing circuitry 546 configured to process Service Data Units (SDUs) received from adjacent layers in the radio protocol stack. In some examples, upon reception of a PDCP SDU from an upper sublayer, the PDCP processing circuitry 546 may associate a Sequence Number (SN) corresponding to the next SN in a session to the PDCP SDU. The PDCP processing circuitry 546 may further perform header compression, integrity protection and ciphering of the PDCP SDU using a COUNT value for the PDCP SDU. The COUNT value may correspond to the concatenation of a current Hyper Frame Number (HFN) maintained locally (e.g., in memory 505) and the SN associated with the PDCP SDU. The PDCP processing circuitry 546 may further increment the next SN by one upon assigning the current SN to the PDCP PDU. However, if the next SN exceeds the maximum SN, the processing circuitry 546 may reset the next SN to 0 and increment the HFN by one. The PDCP processing circuitry 546 may then output the resulting PDCP Packet Data Unit (PDU) to a lower sublayer (e.g., the RLC sublayer 212 shown in FIG. 2).

In some examples, upon reception of a PDCP SDU containing an SN field from a lower sublayer, the PDCP processing circuitry 546 may decipher the PDCP SDU and verify the integrity of the PDCP SDU (if applicable) using the COUNT value (e.g., the concatenation of the current HFN maintained locally and the SN included within the PDCP SDU). The PDCP processing circuitry 546 may further increment the next SN by one. However, if the next SN exceeds the maximum SN, the processing circuitry 546 may reset the next SN to 0 and increment the HFN by one. The PDCP processing circuitry 546 may then output the resulting PDCP Packet Data Unit (PDU) to an upper sublayer (e.g., the RRC sublayer 216 shown in FIG. 2). The PDCP processing circuitry 546 may operate in coordination with PDCP processing software 556.

The processor 504 may further include count synchronization circuitry 548 configured to initiate or trigger a COUNT synchronization with another wireless communication device in wireless communication with the wireless communication device 500. For example, the wireless communication device 500 may be engaged in a session with the other wireless communication device over a wireless connection (e.g., over an air interface). During the session, each packet transmitted between the wireless communication device 500 and the other wireless communication device may have a COUNT value (e.g., a combination of an HFN and SN) assigned thereto that uniquely identifies the packet in the sequence of packets transmitted between the wireless communication devices. In some examples, the COUNT value is not reused during a session, and therefore, the number of bits for the COUNT value may be large, e.g., 32 bits. However, to reduce overhead, only the SN of the COUNT value, which may be 7 or 12 bits, may be transmitted in the header of the packet. The HFN is retained locally (e.g., in memory 505) on both of the wireless communication devices.

When operating in an Unacknowledged Mode (UM) (e.g., HARQ UM), there may be a potential risk of losing HFN synchronization between the wireless communication devices. To ensure the HFN remains synchronized on both the wireless communication device 500 and the other wireless communication device during the session, the count synchronization circuitry 548 may be configured to periodically or in response to a trigger, initiate a COUNT synchronization with the other wireless communication device. For example, the count synchronization circuitry 548 may initiate a COUNT synchronization based on the number of packets transmitted after a previous COUNT synchronization, upon expiration of a timer, in response to a fade event, or in response to a packet loss event.

In some examples, the count synchronization circuitry 548 may initialize a counter 515 in response to completion of a previous COUNT synchronization in order to count the packets transmitted after completion of the previous COUNT synchronization. The counter 515 may be maintained, for example, in memory 505. The count synchronization circuitry 548 may then initiate the COUNT synchronization when the counter 515 reaches a predetermined number of transmitted packets. The number of transmitted packets may correspond to the number of packets transmitted by the wireless communication device 500 during the session, the number of packets received by the wireless communication device 500 (e.g., packets transmitted by the other wireless communication device) during the session or the total number of packets transmitted and received by the wireless communication device 500 (e.g., packets transmitted by both the wireless communication device 500 and the other wireless communication device) during the session.

In some examples, the count synchronization circuitry 548 may initialize a timer 516 in response to completion of a previous COUNT synchronization. The timer 516 may be maintained, for example, in memory 505. The count synchronization circuitry 548 may then initiate a new COUNT synchronization upon expiration of the timer 516.

In some examples, the count synchronization circuitry 548 may trigger the COUNT synchronization in response to a fade event. For example, the count synchronization circuitry 548 may determine that a signal-to-noise ratio of the wireless connection has dropped below a threshold (T) 517, and thus, may initiate a COUNT synchronization. In some examples, the count synchronization circuitry 548 may trigger the COUNT synchronization in response to a packet loss event. For example, the count synchronization circuitry 548 may trigger a COUNT synchronization in response to determining that the number of lost packets within a predefined time period exceeds a threshold (T) 517. Thus, the threshold (T) 517 may include more than one threshold, depending on the COUNT synchronization trigger. The determination of the number of lost packets may be based on, for example, ACK/NACK messages received from the other wireless communication device.

Upon initiating a COUNT synchronization, the count synchronization circuitry 548 may transmit at least a current hyper frame number (HFN) of the current COUNT value, as determined locally on the wireless communication device 500, over the wireless connection to synchronize the current COUNT value. The COUNT synchronization may be performed in-band or out-of-band. In some examples, in-band COUNT synchronization may be initiated by either the UE or base station (eNB), whereas out-of-band COUNT synchronization may be initiated by only the base station (eNB or gNB).

For in-band COUNT synchronization, the count synchronization circuitry 548 may be configured to receive a packet to be transmitted to the other wireless communication device during the session and include the full COUNT value (e.g., both the HFN and SN) in the header of the packet. The count synchronization circuitry 548 may thus operate in coordination with the PDCP processing circuitry 546 to modify the header of the PDCP PDU to include the full COUNT value and provide the PDCP PDU with the modified header to the lower sublayers for transmission of the packet with the modified PDCP header to the other wireless communication device via the transmitter 520. In some examples, the full COUNT value may be included in a Radio Link Control (RLC) header or a Media Access Control (MAC) header, instead of a PDCP header.

The count synchronization circuitry 548 may further be configured to operate in coordination with the PDCP processing circuitry 546 to include an indication of the format of the COUNT value (e.g., full COUNT value) in the PDCP PDU. In some examples, the PDCP processing circuitry 546 may include the format indication (e.g., full COUNT value or short COUNT value) in each PDCP PDU. If the short COUNT value format is indicated, the packet may contain only the SN, and not the HFN.

For out-of-band COUNT synchronization, the count synchronization circuitry 548 may be configured to transmit the current HFN of the current COUNT value within an out-of-band control message (e.g., separate from a packet containing a SN). For example, the out-of-band message may include a Radio Resource Control (RRC) message or a user plane control message (e.g., PDCP/RLC/MAC). In some examples, when transmitting the HFN within a RRC message, the PDCP-config Information Element (IE) may be modified to include a parameter (hfn) when operating in the Unacknowledged Mode (UM) as follows:

```
-- ASN1START
PDCP-Config ::=                        SEQUENCE {
    discardTimer                           ENUMERATED {
                                               ms50, ms100, ms150, ms300,
ms500,
                                               ms750, ms1500, infinity
    }                                                      OPTIONAL,      --
Cond Setup
    rlc-AM                                 SEQUENCE {
            statusReportRequired           BOOLEAN
    }                                                      OPTIONAL,      --
Cond Rlc-AM
    rlc-UM                                 SEQUENCE {
            pdcp-SN-Size                   ENUMERATED {len7bits,
len12bits}
    }                                                      OPTIONAL,      --
Cond Rlc-UM
    hfn                                    INTEGER    OPTIONAL
    headerCompression                      CHOICE {
            notUsed                            NULL,
            rohc                               SEQUENCE {
                    maxCID                         INTEGER (1..16383)
DEFAULT 15,
                    profiles                       SEQUENCE {
                            profile0x0001                  BOOLEAN,
                            pr0file0x0002                  BOOLEAN,
                            pr0file0x0003                  BOOLEAN,
                            pr0file0x0004                  BOOLEAN,
                            pr0file0x0006                  BOOLEAN,
                            profile0x0101                  BOOLEAN,
                            pr0file0x0102                  BOOLEAN,
                            pr0file0x0103                  BOOLEAN,
                            pr0file0x0104                  BOOLEAN
                    },
```

```
                ...
            }
        },
        ...,
        [[      rn-IntegrityProtection-r10      ENUMERATED {enabled}      OPTIONAL    --
Cond RN
        ]],
        [[      pdcp-SN-Size-v1130             ENUMERATED {len15bits}    OPTIONAL    --
Cond Rlc-AM2
        ]],
        [[      ul-DataSplitDRB-ViaSCG-r12      BOOLEAN   OPTIONAL,                  --
Need ON
                t-Reordering-r12                ENUMERATED {
                                                ms0, ms20, ms40, ms60, ms80, ms100,
ms120,
                                                 ms140, ms160, ms180, ms200, ms220,
                                                ms240,
                                                 ms260, ms280, ms300,ms500, ms750,
                                                spare14,
                                                  spare13, spare12, spare11,
                                                spare10,spare9,
                                                  spare8, spare7, spare6, spare5,
                                                spare 4,
                                                  spare3, spare2, spare1}
                                                                            OPTIONAL
                                                -- Cond SetupS
        ]]
}
-- ASN1STOP
```

In some examples, when transmitting the HFN within a user plane control message, the count synchronization circuitry 548 may utilize modified PDCP/RLC control packets (e.g., PDCP HFN PDU or RLC HFN PDU) or modified MAC control elements (CE) (e.g., MAC CE). In addition, the modified user plane control packets may be integrity protected and/or ciphered for security (e.g., the control PDU may include a SN and/or signature). For example, an integrity protection signature may be included within the PDCP HFN PDU, the RLC HFN PDU or the MAC CE carrying the current hyper frame number. In addition, a control PDU sequence number may be included within the PDCP HFN PDU, the RLC HFN PDU or the MAC CE carrying the current hyper frame number to enable retransmission and ciphering of the out-of-band control message.

The count synchronization circuitry 548 may further be configured to include the current SN of the current COUNT value in the out-of-band control message to indicate to the other wireless communication device that the HFN maintained locally on the other wireless communication should be synchronized to the received HFN value for the current SN onward, taking into consideration SN wrap-around. Thus, by including the SN with the HFN in the out-of-band control message, HFN synchronization may be achieved online (e.g., without interruption of data transmission and reception during the session).

However, if the current SN is not included within the out-of-band control message, and the HFN is out-of-sync on the other wireless communication device, the other wireless communication device may transmit an out-of-sync flag to the wireless communication device 500 to cause the count synchronization circuitry 548 to trigger an offline resync procedure. The other wireless communication device may further include the current HFN value locally maintained on the other wireless communication device with the out-of-sync flag. When the offline resync procedure is triggered, the count synchronization circuitry 548 may suspend data transmission and reception of user plane data and control plane data on both sides (e.g., on both the wireless communication device 500 and the other wireless communication device). For example, the count synchronization circuitry 548 may transmit a message to the other wireless communication device to suspend data transmission and reception.

The count synchronization circuitry 548 may then select a new HFN that is equal to or larger than the largest current HFN maintained locally on both the wireless communication device 500 or the other wireless communication device, reset the current HFN to the new HFN locally (e.g., within memory 505) and transmit the new HFN to the other wireless communication device to synchronize the HFN. For example, the new HFN may be transmitted to the other wireless communication device via an RRC message or a user plane control message. In addition, upon selecting and transmitting the new HFN, the wireless communication device 500 and the other wireless communication device may update the HFN of all packets in their receive, retransmission and transmission buffers 518 to the new HFN. The buffers 518 may be separate from memory 505, as shown in FIG. 5, or included within memory 505. The count synchronization circuitry 548 may then resume data transmission and reception on both the wireless communication device 500 and the other wireless communication device. In some examples, upon receiving an HFN synchronization complete indication over the wireless connection from the other wireless communication device indicating that the other wireless communication device has reset its locally stored HFN to the new HFN, the count synchronization circuitry 548 may resume data transmission and reception.

The COUNT synchronization may also be initiated by the other wireless communication device. For example, the count synchronization circuitry 548 may receive an in-band COUNT synchronization packet from the other wireless communication device. The count synchronization circuitry 548 may then determine whether a full COUNT value is included in the header (e.g., PDCP, RLC or MAC header) of the packet, and if so, decipher the packet payload using the full COUNT value. The count synchronization circuitry 548 may further synchronize the locally maintained HFN based on the HFN included in the full COUNT value.

When receiving an out-of-band COUNT synchronization control message, the count synchronization circuitry 548 may receive the current HFN in the out-of-band control message. If the out-of-band control message further includes the current SN, the count synchronization circuitry 548 may set the locally maintained HFN to the received HFN value for the received SN and all SNs after the received SN (e.g., greater than the received SN), taking into consideration HFN wrap-around. The count synchronization circuitry 548 may then transmit an HFN synchronization complete message to the other wireless communication device.

If the out-of-band control message does not include the current SN, the count synchronization circuitry 548 may compare the received HFN with the locally stored HFN. If the HFN's match, the count synchronization circuitry 548 may transmit an HFN synchronization complete message to the other wireless communication device. However, if the HFN's do not match (e.g., the HFN's are out-of-sync), the count synchronization circuitry 548 may transmit an out-of-sync flag, together with the current locally stored HFN value, to the other wireless communication device to trigger a resync procedure. During the resync procedure, the count synchronization circuitry 548 may suspend data transmission and reception with the other wireless communication device and receive a new HFN from the other wireless communication device. The count synchronization circuitry 548 may then set the locally stored HFN to the new HFN, transmit the HFN synchronization complete indication to the other wireless communication device, and resume data transmission and reception with the other wireless communication device. The count synchronization circuitry 548 may operate in coordination with count synchronization software 558. The circuitry included in the processor 504 is provided as non-limiting examples. Other means for carrying out the described functions exists and is included within various aspects of the present disclosure.

Figure 6:
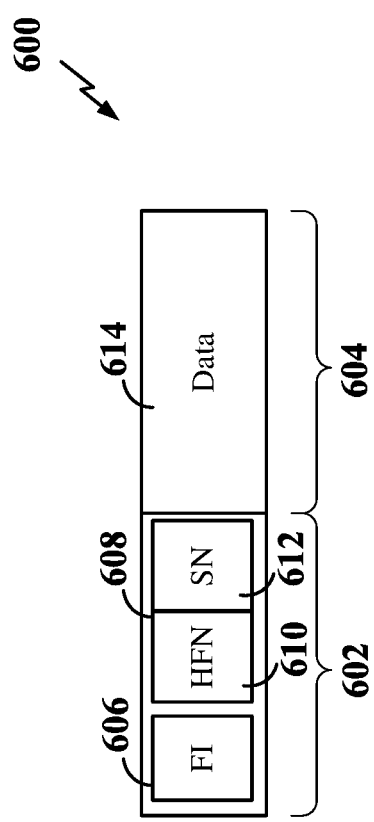
FIG. 6 is a diagram illustrating an example of a format of a packet including a full COUNT value in accordance with aspects of the disclosure.

FIG. 6 illustrates an example of a format of a packet 600 including a full COUNT value in accordance with aspects of the present disclosure. The packet may correspond to, for example, a PDCP PDU. The packet format 600 includes a header 602 and a body 604. The header 602 includes a format indication field 606 and a COUNT value field 608. The format indication (FI) field 606 may include a single bit for indicating whether the full COUNT value or the short COUNT value is included in the packet 600. If the format indication field 606 indicates that the full COUNT value is included in the packet, the COUNT value field 608 includes both the hyper frame number (HFN) 610 and the sequence number (SN) 612. However, if the format indication field 606 indicates that the short COUNT value is included in the packet, the COUNT value field includes only the SN 612, as shown and described above in reference to FIG. 3. The body 604 contains uncompressed or compressed user or control plane data 614, as shown and described above in reference to FIG. 3.

Figure 7:
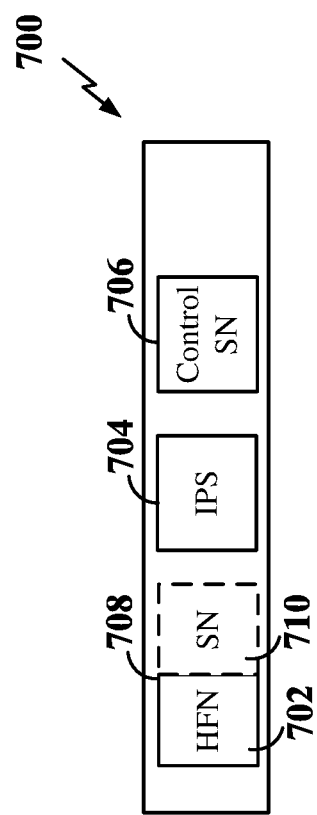
FIG. 7 is a diagram illustrating an example of a format of a control message including at least the hyper frame number (HFN) in accordance with aspects of the disclosure.

FIG. 7 illustrates an example of a format of a control message 700 including at least a hyper frame number (HFN) 702 in accordance with aspects of the present disclosure. For example, the out-of-band message may include a Radio Resource Control (RRC) message or a user plane control message (e.g., PDCP/RLC/MAC). In some examples, when the control message 700 is a user plane control message, the user plane control message 700 may also include an integrity protection signature (IPS) 704 and a control PDU sequence number (Control SN) 706 to enable retransmission and ciphering of the control message. In some examples, the control message 700 may include the full COUNT value 708, including both the HFN 702 and the current SN 710, to indicate to the other wireless communication device that the HFN maintained locally on the other wireless communication should be synchronized to the received HFN value for the current SN onward, taking into consideration SN wrap-around.

Figure 8:
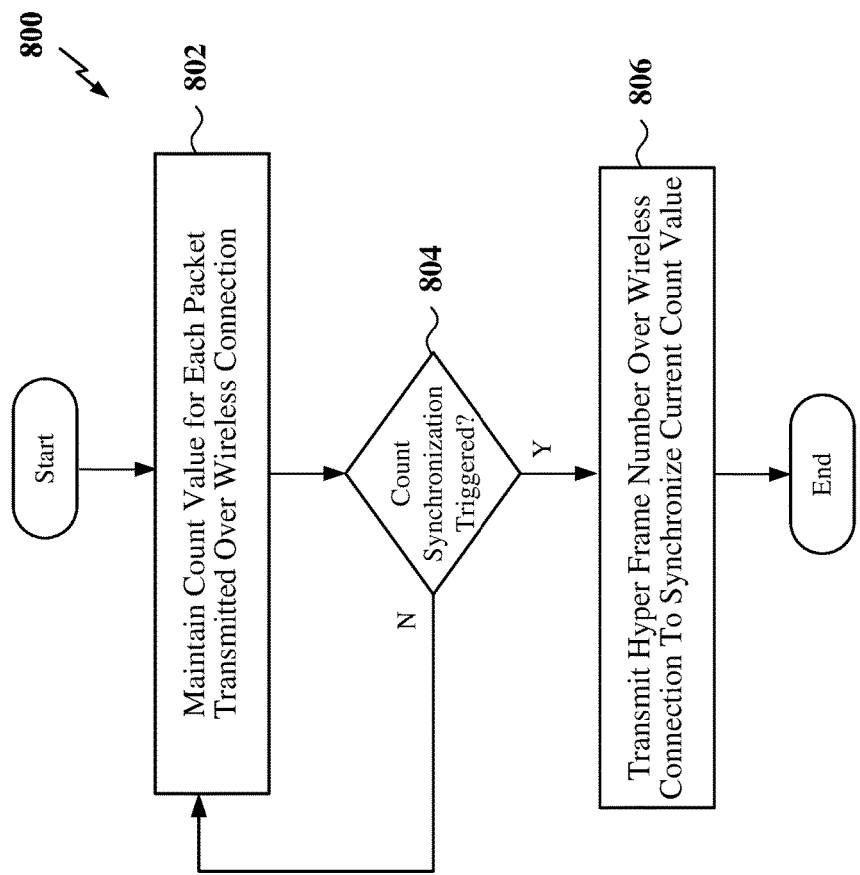
FIG. 8 is a flow chart of a method of count synchronization according to some aspects of the disclosure.

FIG. 8 is a flow chart illustrating an exemplary process 800 for performing COUNT synchronization in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the wireless communication device 500 illustrated in FIG. 5. In some examples, the process 800 may be carried out by any suitable apparatus or means for carrying out the functions or algorithm described below.

At block 802, the wireless communication device may maintain a COUNT value for each packet transmitted over a wireless connection with another wireless communication device. For example, the PDCP processing circuitry 546 shown and described above in reference to FIG. 5 may maintain the COUNT value.

At block 804, the wireless communication device may determine whether a COUNT synchronization has been triggered. For example, the count synchronization circuitry 548 shown and described above in reference to FIG. 5 may determine whether a COUNT synchronization has been triggered. In some examples, the COUNT synchronization may be triggered based on a number of packets transmitted after a previous COUNT synchronization, upon expiration of a timer, in response to a fade event or in response to a packet loss event.

If a COUNT synchronization has been triggered (Y branch of block 804), at block 806, the wireless communication device may transmit the current Hyper Frame Number (HFN) maintained locally on the wireless communication device to the other wireless communication device over the wireless connection therebetween to synchronize the current COUNT value on the wireless communication devices. For example, the count synchronization circuitry 548 shown and described above in reference to FIG. 5 may transmit the current HFN. In some examples, the current Sequence Number (SN) may also be transmitted with the HFN. In addition, the HFN (with or without the SN) may be transmitted in-band or out-of-band.

Figure 9:
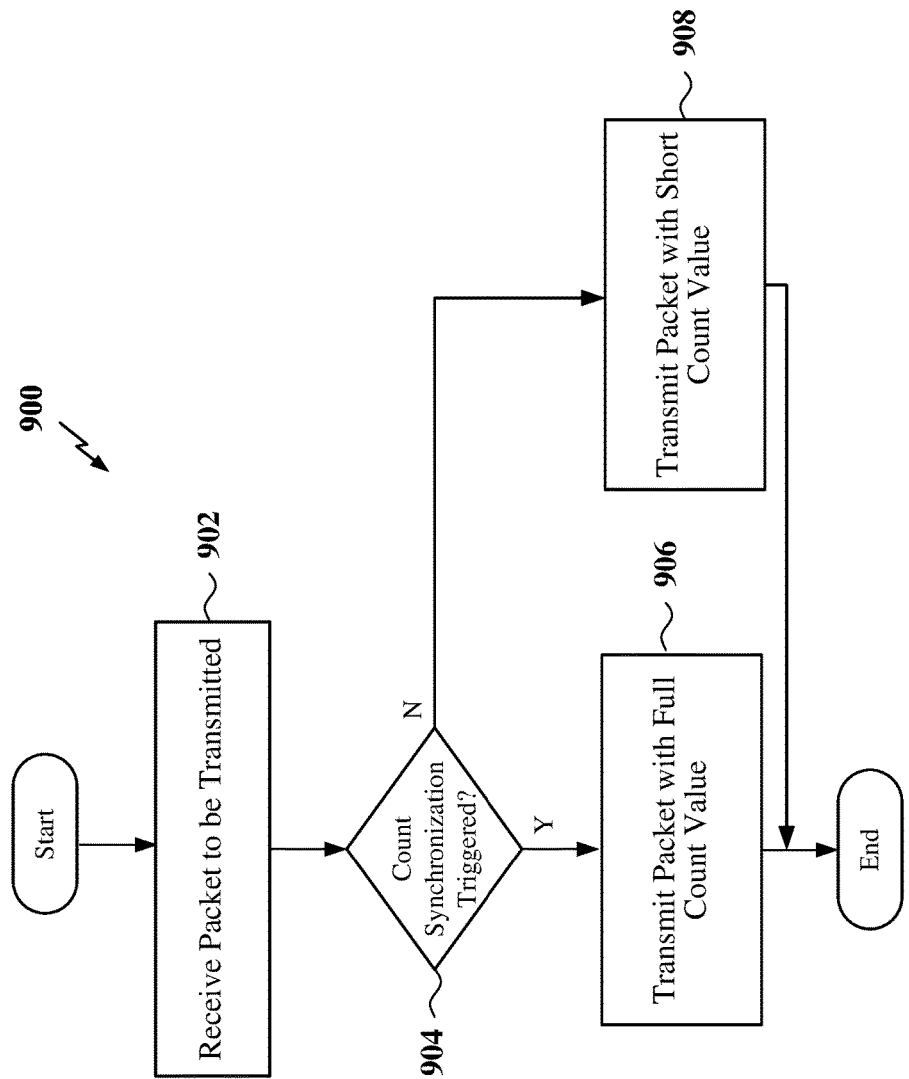
FIG. 9 is a flow chart of a method of in-band count synchronization according to some aspects of the disclosure.

FIG. 9 is a flow chart illustrating an exemplary process 900 for performing in-band count synchronization according to some aspects of the present disclosure. As described below, some or all illustrated features may be omitted in a particular implementation within the scope of the present disclosure, and some illustrated features may not be required for implementation of all embodiments. In some examples, the process 900 may be carried out by the wireless communication device 500 illustrated in FIG. 5. In some examples, the process 900 may be carried out by any suitable apparatus or means for carrying out the functions or algorithm described below.

At block 902, the wireless communication device may receive a packet to be transmitted to another wireless communication device over a wireless connection. For example, the count synchronization circuitry 548 shown and described above in reference to FIG. 5 may receive the packet in coordination with the PDCP processing circuitry 546 shown and described above in reference to FIG. 5.

At block 904, the wireless communication device may determine whether a COUNT synchronization has been triggered. For example, the count synchronization circuitry 548 shown and described above in reference to FIG. 5 may determine whether a COUNT synchronization has been triggered. In some examples, the COUNT synchronization may be triggered based on a number of packets transmitted after a previous COUNT synchronization, upon expiration of a timer, in response to a fade event or in response to a packet loss event.

If a COUNT synchronization has been triggered (Y branch of block 904), at block 906, the wireless communication device may transmit the packet with a full COUNT value (e.g., both the current Hyper Frame Number (HFN) maintained locally on the wireless communication device and the Sequence Number (SN)) to the other wireless communication device over the wireless connection therebetween to synchronize the current COUNT value on the wireless communication devices. For example, the count synchronization circuitry 548 shown and described above in reference to FIG. 5 may transmit the full COUNT value within the header of the packet. In some examples, the full COUNT value may be included within a PDCP, RLC or MAC header of the packet.

If a COUNT synchronization has not been triggered (N branch of block 904), at block 908, the wireless communication device may transmit the packet with the short COUNT value (e.g., only the SN). For example, the PDCP processing circuitry 546 shown and described above in reference to FIG. 5 may include only the SN in the header of the packet.

Figure 10:
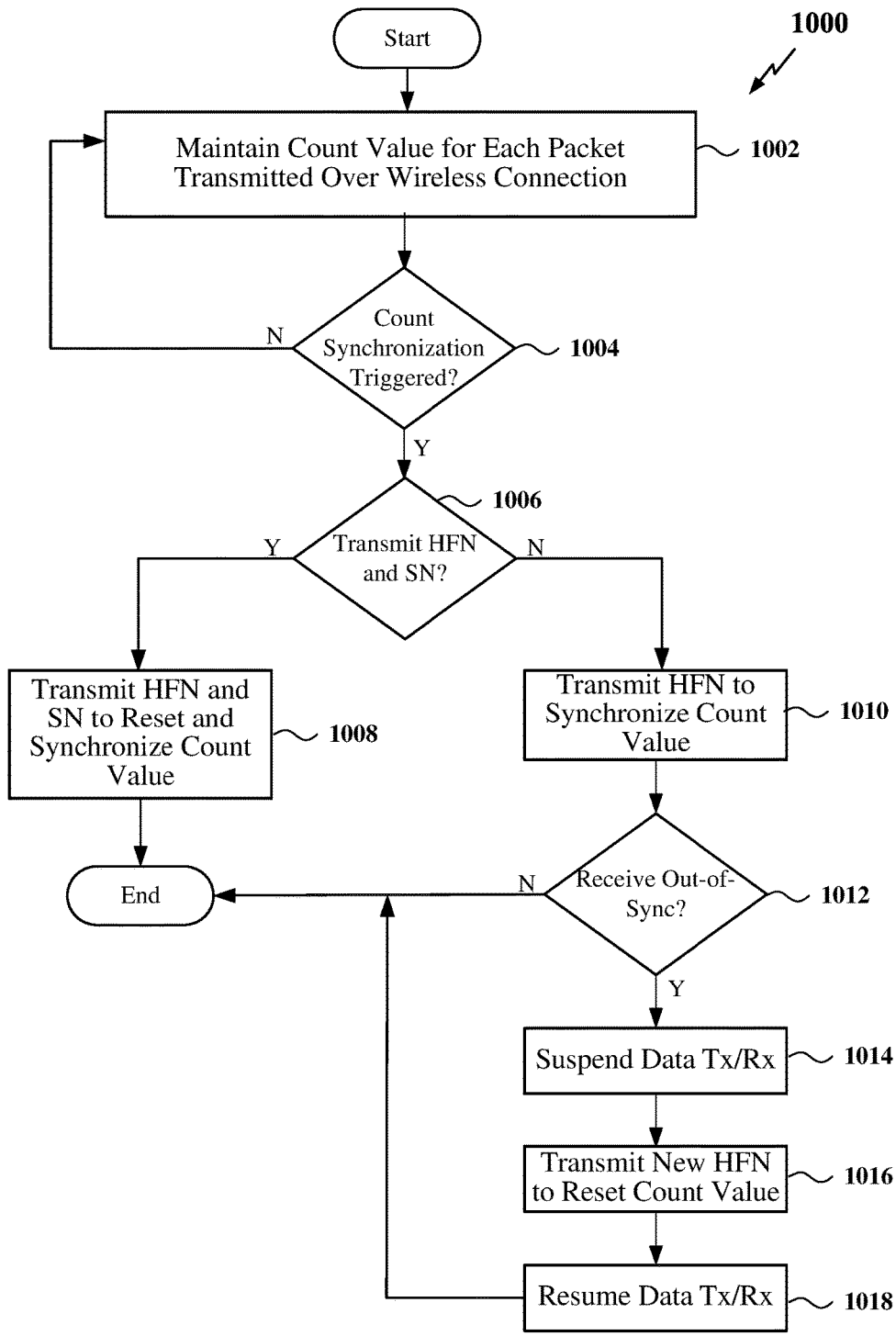
FIG. 10 is a flow chart of a method of out-of-band count synchronization according to some aspects of the disclosure.

FIG. 10 is a flow chart illustrating an exemplary process 1000 for performing out-of-band count synchronization according to some aspects of the present disclosure. As described below, some or all illustrated features may be omitted in a particular implementation within the scope of the present disclosure, and some illustrated features may not be required for implementation of all embodiments. In some examples, the process 1000 may be carried out by the wireless communication device 500 illustrated in FIG. 5. In some examples, the process 1000 may be carried out by any suitable apparatus or means for carrying out the functions or algorithm described below.

At block 1002, the wireless communication device may maintain a COUNT value for each packet transmitted over a wireless connection with another wireless communication device. For example, the PDCP processing circuitry 546 shown and described above in reference to FIG. 5 may maintain the COUNT value.

At block 1004, the wireless communication device may determine whether a COUNT synchronization has been triggered. For example, the count synchronization circuitry 548 shown and described above in reference to FIG. 5 may determine whether a COUNT synchronization has been triggered. In some examples, the COUNT synchronization may be triggered based on a number of packets transmitted after a previous COUNT synchronization, upon expiration of a timer, in response to a fade event or in response to a packet loss event.

If a COUNT synchronization has been triggered (Y branch of block 1004), at block 1006, the wireless communication device may determine whether to include the current SN with the current HFN to synchronize the COUNT values. For example, the count synchronization circuitry 548 shown and described above in reference to FIG. 5 may determine whether to include the SN with the HFN. If the SN is to be included (Y branch of block 1006), at block 1008, the wireless communication device may transmit both the current SN and the current HFN to the other wireless communication device over the wireless connection to reset the COUNT value on the other wireless communication device and synchronize the COUNT values on both wireless communication devices. For example, the count synchronization circuitry 548 shown and described above in reference to FIG. 5 may transmit the SN and HFN over the wireless connection. In some examples, the SN and HFN may be transmitted within an out-of-band control message, such as a Radio Resource Control (RRC) message or a user plane control message (e.g., PDCP/RLC/MAC).

If the SN is not to be included with the HFN (N branch of block 1006), at block 1010, the wireless communication device may transmit the current HFN to the other wireless communication device over the wireless connection to synchronize the COUNT values. For example, the count synchronization circuitry 548 shown and described above in reference to FIG. 5 may transmit the current HFN over the wireless connection. In some examples, the current HFN may be transmitted within an out-of-band control message, such as a Radio Resource Control (RRC) message or a user plane control message (e.g., PDCP/RLC/MAC).

At block 1012, the wireless communication device determines whether an out-of-sync flag has been received from the other wireless communication device, indicating that the current HFN transmitted to other wireless communication device does not match the locally stored HFN on the other wireless communication device. For example, the count synchronization circuitry 548 shown and described above in reference to FIG. 5 may determine whether the out-of-sync flag is received.

If the out-of-sync flag is received (Y branch of block 1012), at block 1014, the wireless communication device may suspend data transmission and reception over the wireless connection. For example, the count synchronization circuitry 548 shown and described above in reference to FIG. 5 may suspend the data transmission and reception. At block 1016, the wireless communication device may select and transmit a new HFN value over the wireless connection to reset the COUNT value on the other wireless communication device. For example, the count synchronization circuitry 548 shown and described above in reference to FIG. 5 may transmit the new HFN over the wireless connection. In some examples, the new HFN is greater than or equal to the largest current HFN maintained locally on either wireless communication device.

At block 1018, the wireless communication device may resume data transmission and reception over the wireless connection. For example, the count synchronization circuitry 548 shown and described above in reference to FIG. 5 may resume data transmission and reception. In some examples, the wireless communication device may resume data transmission and reception after receiving an HFN synchronization complete indication from the other wireless communication device.

Figure 11:
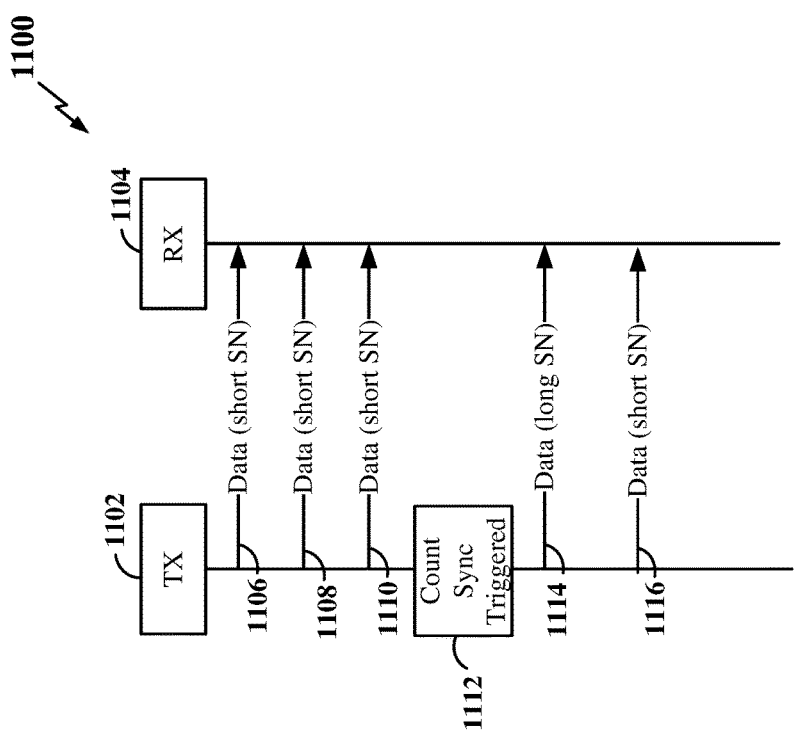
FIG. 11 is a packet flow diagram illustrating an example of in-band count synchronization according to some aspects of the disclosure.

FIG. 11 is a packet flow diagram illustrating an example of in-band count synchronization 1100 according to some aspects of the present disclosure. In the example shown in FIG. 11, a transmitter 1102 (e.g., a transmitter within a wireless communication device) is engaged in a session with a receiver 1104 (e.g., a receiver within a wireless communication device) over a wireless connection. At 1106-1110, the transmitter 1102 may transmit a plurality of data packets, each including a short COUNT value (e.g., only the SN), to the receiver 1104. The transmitter 1102 may then trigger a COUNT synchronization at 1112. Upon triggering the COUNT synchronization, at 1114, the transmitter may transmit a data packet with the full or long COUNT value (e.g., both the HFN and SN) to the receiver 1104 to synchronize the COUNT values on the transmitter 1102 and receiver 1104. After COUNT synchronization, at 1116, the transmitter 1102 may again transmit data packets to the receiver 1104 using the short COUNT value.

Figure 12:
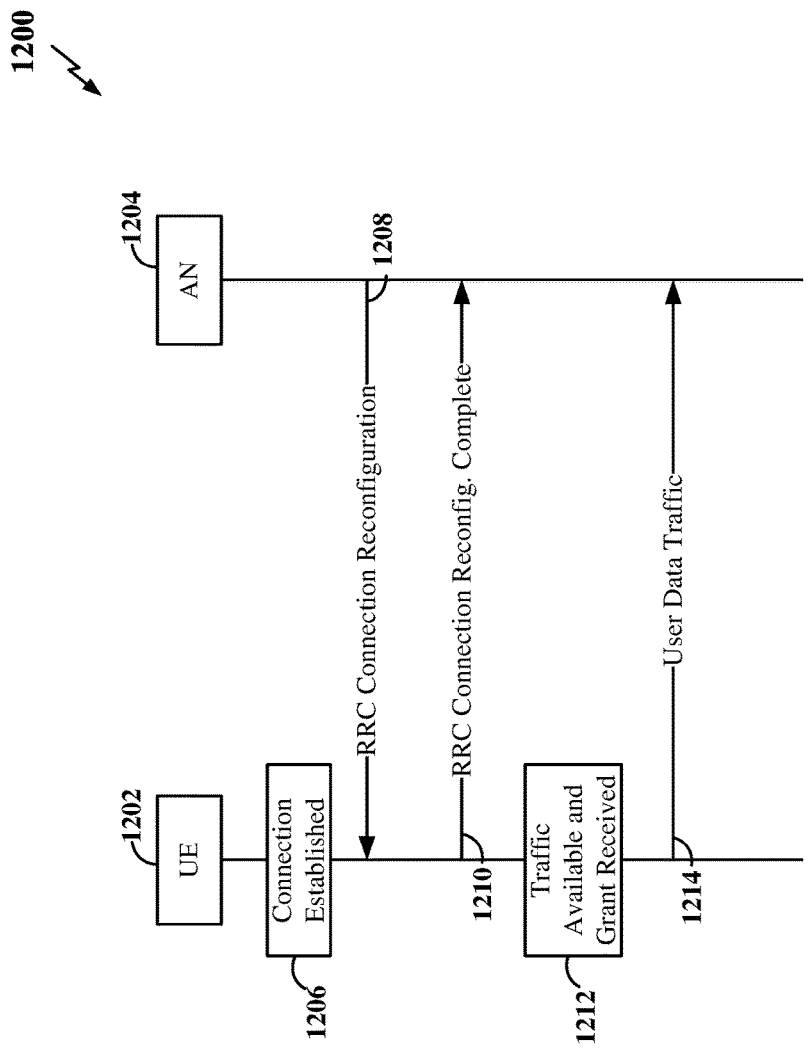
FIG. 12 is a packet flow diagram illustrating an example of out-of-band count synchronization according to some aspects of the disclosure.

FIG. 12 is a packet flow diagram illustrating an example of out-of-band count synchronization according to some aspects of the present disclosure. In the example shown in FIG. 12, a UE 1202 or other wireless communication device is engaged in a session with an access network (AN) 1204 (e.g., a base station or eNB) over a wireless connection. At 1206, the wireless connection between the UE 1202 and AN 1204 may be established. At 1208, the AN 1204 may initiate a COUNT synchronization by transmitting a Radio Resource Connection (RRC) connection reconfiguration message including the current HFN (and optionally the current SN) to the UE 1202 to synchronize the COUNT values on the UE 1202 and AN 1204. At 1210, the UE 1202 may transmit an RRC connection reconfiguration complete message to the AN 1204 to indicate that the HFN maintained locally on the UE 1202 has been synchronized with the HFN maintained locally at the AN 1204. At 1212, the UE 1202 determines that user data traffic is available to be transmitted to the AN 1204 and requests a grant of uplink resources to transmit the user data traffic. At 1214, the UE 1202 transmits the user data traffic on the uplink to the AN 1204 based on the grant with the current COUNT value determined using the synchronized HFN.

Figure 13:
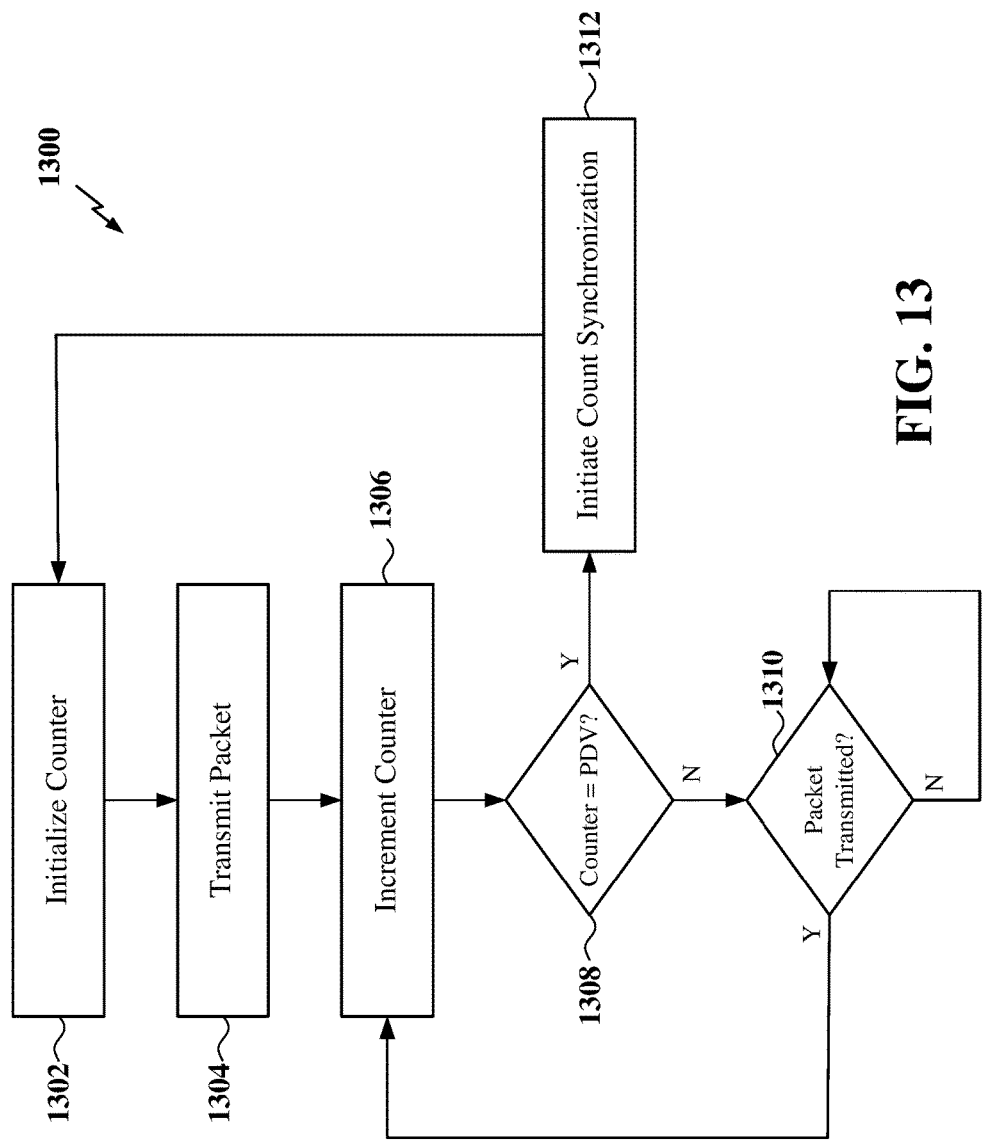
FIG. 13 is a flow chart of a method of initiating count synchronization according to some aspects of the disclosure.

FIG. 13 is a flow chart illustrating an exemplary process 1300 for initiating count synchronization according to some aspects of the present disclosure. As described below, some or all illustrated features may be omitted in a particular implementation within the scope of the present disclosure, and some illustrated features may not be required for implementation of all embodiments. In some examples, the process 1300 may be carried out by the wireless communication device 500 illustrated in FIG. 5. In some examples, the process 1300 may be carried out by any suitable apparatus or means for carrying out the functions or algorithm described below.

At block 1302, the wireless communication device may initialize a counter. For example, the count synchronization circuitry 548 shown and described above in reference to FIG. 5 may initialize the counter. At block 1304, the wireless communication device may transmit a packet over a wireless air interface to a receiving wireless communication device. For example, the transceiver 510 together with the communication circuitry 542 and signal processing circuitry 544 shown and described above in reference to FIG. 5 may generate and transmit the packet to the receiving wireless communication device.

At block 1306, after transmitting the packet, the wireless communication device may increment the counter by one. For example, the count synchronization circuitry 548 shown and described above in reference to FIG. 5 may increment the counter. At block 1308, the wireless communication device may determine whether the counter has reached a predetermined value (PDV) corresponding to a predetermined number of transmitted packets. For example, the count synchronization circuitry 548 shown and described above in reference to FIG. 5 may determine whether the counter value is equal to the PDV.

If the counter value is not equal to the PDV (N branch of block 1308), at block 1310, the wireless communication device may determine whether another packet has been transmitted, and if so (Y branch of block 1310), return to block 1306 to increment the counter by one. For example, the count synchronization circuitry 548 shown and described above in reference to FIG. 5 may determine whether another packet has been transmitted, and if so, increment the counter again by one.

If the counter value is equal to the PDV (Y branch of block 1308), at block 1312, the wireless communication device may initiate count synchronization, and then return to block 1302 to re-initialize the counter to zero. For example, the count synchronization circuitry 548 shown and described above in reference to FIG. 5 may initiate count synchronization upon the counter reaching the PDV, and then re-initialize the counter to zero.

Figure 14:
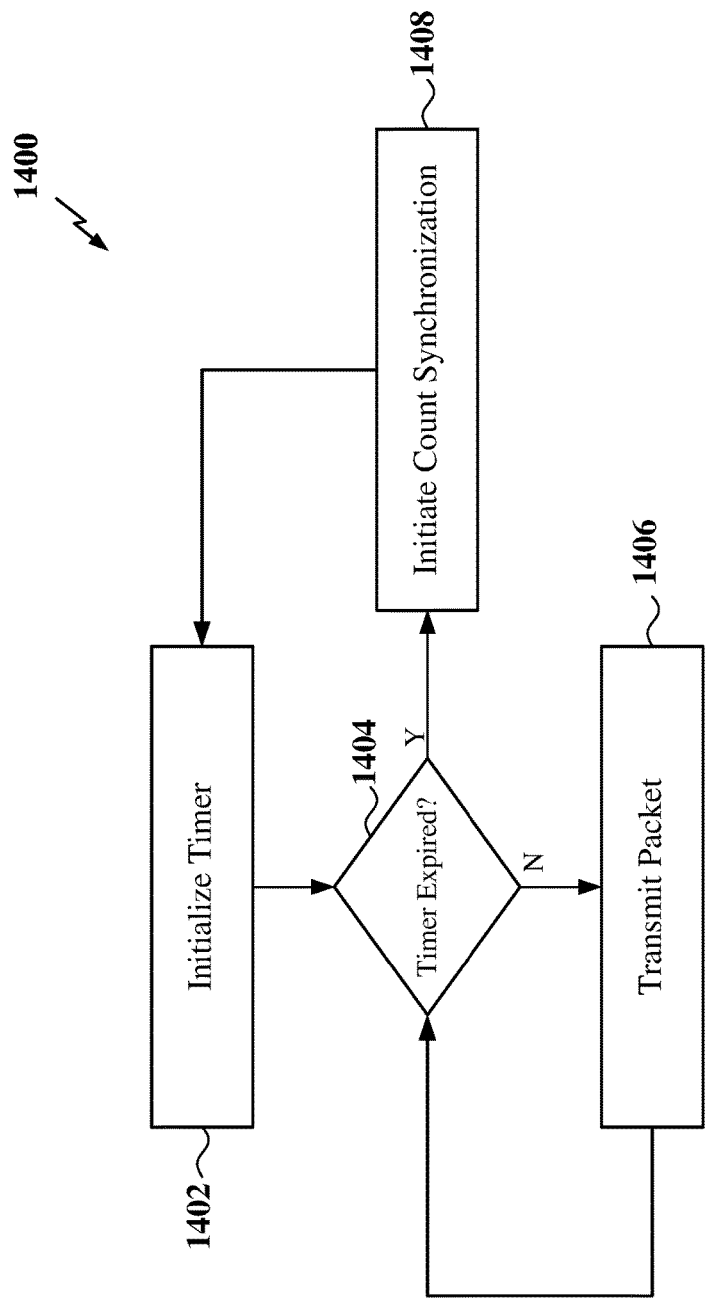
FIG. 14 is a flow chart of another method of initiating count synchronization according to some aspects of the disclosure.

FIG. 14 is a flow chart illustrating another exemplary process 1400 for initiating count synchronization according to some aspects of the present disclosure. As described below, some or all illustrated features may be omitted in a particular implementation within the scope of the present disclosure, and some illustrated features may not be required for implementation of all embodiments. In some examples, the process 1400 may be carried out by the wireless communication device 500 illustrated in FIG. 5. In some examples, the process 1400 may be carried out by any suitable apparatus or means for carrying out the functions or algorithm described below.

At block 1402, the wireless communication device may initialize a timer. For example, the count synchronization circuitry 548 shown and described above in reference to FIG. 5 may initialize the timer. At block 1404, the wireless communication device may determine whether the timer has expired. For example, the count synchronization circuitry 548 shown and described above in reference to FIG. 5 may determine whether the timer has expired.

If the timer has not expired (N branch of block 1404), the wireless communication device may transmit a packet over the wireless air interface to a receiving wireless communication device. For example, the transceiver 510 together with the communication circuitry 542 and signal processing circuitry 544 shown and described above in reference to FIG. 5 may generate and transmit the packet to the receiving wireless communication device.

If the timer has expired (Y branch of block 1404), at block 1408, the wireless communication device may initiate count synchronization, and then return to block 1402 to re-initialize the timer. For example, the count synchronization circuitry 548 shown and described above in reference to FIG. 5 may initiate count synchronization upon expiration of the timer and then re-initialize the timer.

Figure 15:
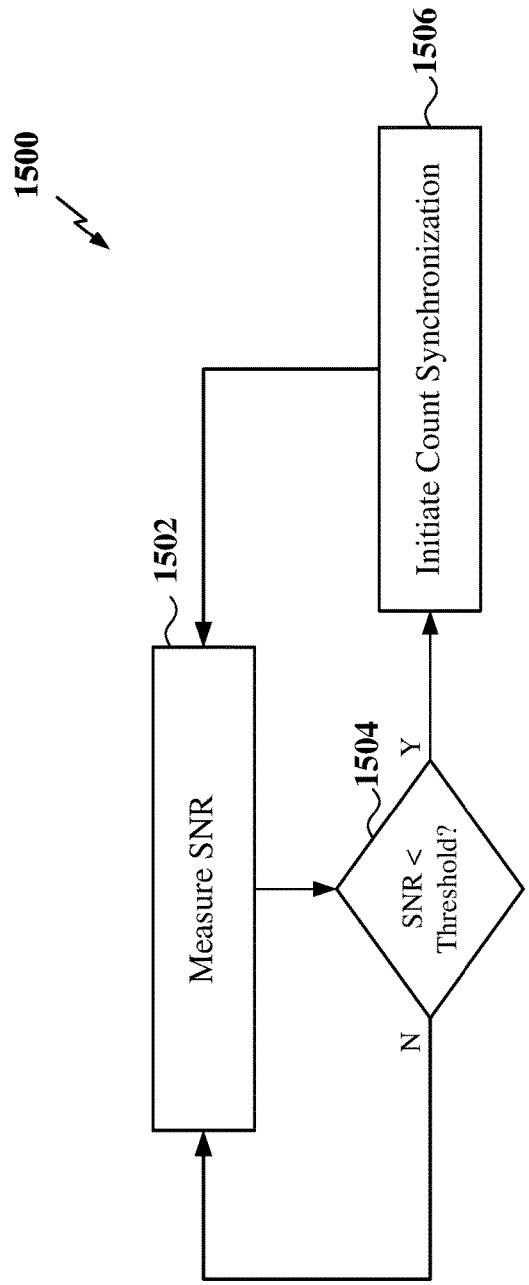
FIG. 15 is a flow chart of another method of initiating count synchronization according to some aspects of the disclosure.

FIG. 15 is a flow chart illustrating another exemplary process 1500 for initiating count synchronization according to some aspects of the present disclosure. As described below, some or all illustrated features may be omitted in a particular implementation within the scope of the present disclosure, and some illustrated features may not be required for implementation of all embodiments. In some examples, the process 1500 may be carried out by the wireless communication device 500 illustrated in FIG. 5. In some examples, the process 1500 may be carried out by any suitable apparatus or means for carrying out the functions or algorithm described below.

At block 1502, the wireless communication device may measure a signal-to-noise ratio (SNR) of a channel between the wireless communication device and another wireless communication device. For example, the count synchronization circuitry 548 shown and described above in reference to FIG. 5 may measure the SNR. At block 1504, the wireless communication device may determine whether the SNR has dropped below a threshold. For example, the count synchronization circuitry 548 shown and described above in reference to FIG. 5 may determine whether the SNR is less than the threshold.

If the SNR is less than the threshold (Y branch of block 1504), at block 1506, the wireless communication device may initiate count synchronization, and then return to block 1502 to measure the SNR. For example, the count synchronization circuitry 548 shown and described above in reference to FIG. 5 may initiate count synchronization upon expiration of the timer and then measure the SNR again.

Figure 16:
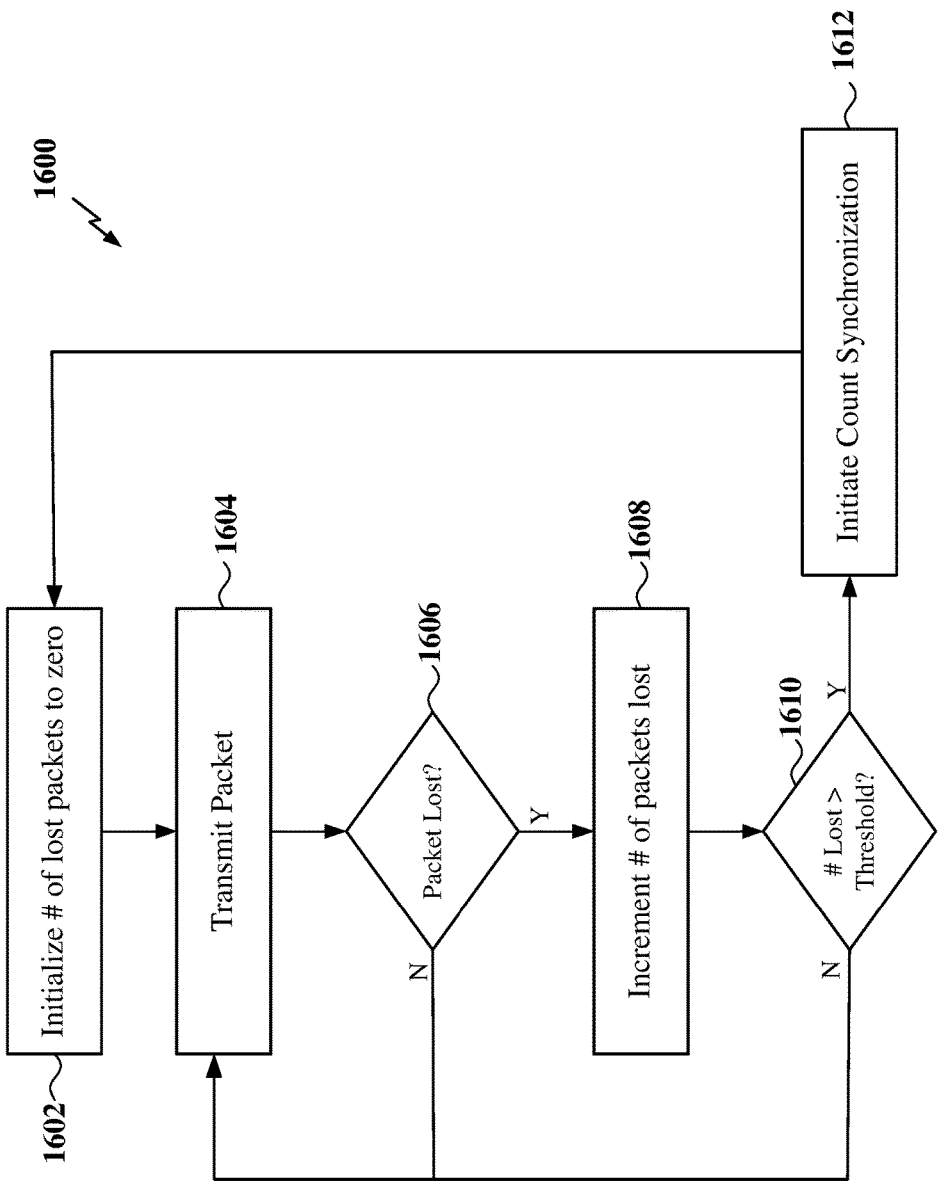
FIG. 16 is a flow chart of another method of initiating count synchronization according to some aspects of the disclosure.

FIG. 16 is a flow chart illustrating another exemplary process 1600 for initiating count synchronization according to some aspects of the present disclosure. As described below, some or all illustrated features may be omitted in a particular implementation within the scope of the present disclosure, and some illustrated features may not be required for implementation of all embodiments. In some examples, the process 1600 may be carried out by the wireless communication device 500 illustrated in FIG. 5. In some examples, the process 1600 may be carried out by any suitable apparatus or means for carrying out the functions or algorithm described below.

At block 1602, the wireless communication device may initialize a number of lost packets to zero. For example, the count synchronization circuitry 548 shown and described above in reference to FIG. 5 may initialize the number of lost packets. At block 1604, the wireless communication device may transmit a packet over a wireless air interface to a receiving wireless communication device. For example, the transceiver 510 together with the communication circuitry 542 and signal processing circuitry 544 shown and described above in reference to FIG. 5 may generate and transmit the packet to the receiving wireless communication device.

At block 1606, after transmitting the packet, the wireless communication device may determine whether the packet was lost. For example, the count synchronization circuitry 548 shown and described above in reference to FIG. 5 may determine whether the packet was lost. If the packet was not lost (N branch of block 1606), the process may return to block 1604, where another packet may be transmitted. If the packet was lost (Y branch of block 1606), at block 1608, the wireless communication device may increment the number of packets lost by one. For example, the count synchronization circuitry 548 shown and described above in reference to FIG. 5 may increment the number of lost packets.

At block 1610, the wireless communication device may determine whether the number of lost packets is greater than a threshold. For example, the count synchronization circuitry 548 shown and described above in reference to FIG. 5 may determine whether the number of lost packets is greater than the threshold. If the number of lost packets is not greater than the threshold (N branch of block 1610), the process may return to block 1604, where another packet may be transmitted.

If the number of lost packets is greater than the threshold (Y branch of block 1610), at block 1612, the wireless communication device may initiate count synchronization, and then return to block 1602 to re-initialize the number of lost packets to zero. For example, the count synchronization circuitry 548 shown and described above in reference to FIG. 5 may initiate count synchronization upon the number of lost packets exceeding the threshold, and then re-initialize the number of lost packets to zero.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1 and 5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of count synchronization in a wireless communication network, the method comprising:
   maintaining, at a transmitting wireless communication device, a respective count value for each packet of a plurality of packets transmitted over a wireless connection with a receiving wireless communication device, each count value comprising a respective hyper frame number and a respective sequence number;
   determining, by the transmitting wireless communication device, that a signal-to-noise ratio of the wireless connection has dropped below a threshold;
   initiating, by the transmitting wireless communication device, a count synchronization of a current count value in response to the signal-to-noise ratio dropping below the threshold, the current count value corresponding to the respective count value of a current packet from among the plurality of packets; and
   transmitting at least a current hyper frame number of the current count value from the transmitting wireless communication device to the receiving wireless communication device over the wireless connection to synchronize the current count value.

2. The method of claim 1, further comprising:
   receiving the current packet for transmission over the wireless connection.

3. The method of claim 2, wherein transmitting at least the current hyper frame number of the current count value over the wireless connection to synchronize the current count value further comprises:
   including a full count value in a header of the current packet in response to the initiating the count synchronization, wherein the full count value comprises the current hyper frame number and a current sequence number; and
   transmitting the current packet comprising the full count value in the header over the wireless connection.

4. The method of claim 3, wherein transmitting the current packet over the wireless connection further comprises:
   including an indication that the current packet comprises the full count value in the current packet.

5. The method of claim 3, wherein the header comprises a Packet Data Convergence Protocol (PDCP) header, a Radio Link Control (RLC) header, or a Media Access Control (MAC) header.

6. The method of claim 2, further comprising:
   transmitting the current packet over the wireless connection, the current packet comprising a short count value in a header of the current packet, wherein the short count value comprises only a current sequence number.

7. The method of claim 1, wherein transmitting at least the current hyper frame number of the current count value over the wireless connection to synchronize the current count value further comprises:
   transmitting the current hyper frame number and a current sequence number of the current count value over the wireless connection to synchronize the current count value.

8. The method of claim 1, further comprising:
   receiving an out-of-sync flag over the wireless connection in response to transmitting at least the current hyper frame number of the current count value;
   suspending data transmission and reception over the wireless connection in response to receiving the out-of-sync flag;
   transmitting a new hyper frame number over the wireless connection to synchronize the current count value; and
   resuming data transmission and reception over the wireless connection.

9. The method of claim 8, wherein the new hyper frame number exceeds the current hyper frame number.

10. The method of claim 8, further comprising:
    receiving a hyper frame number synchronization complete indication over the wireless connection prior to resuming data transmission and reception.

11. The method of claim 1, wherein transmitting at least the current hyper frame number (HFN) of the current count value over the wireless connection to synchronize the current count value further comprises:
    transmitting at least the current hyper frame number of the current count value within a control message, the control message comprising a Radio Resource Control (RRC) message, a Packet Data Convergence Protocol (PDCP) HFN packet data unit (PDU), a Radio Link Control (RLC) HFN PDU, or a Media Access Control (MAC) Control Element (CE).

12. The method of claim 11, wherein transmitting at least the current hyper frame number of the current count value within the control message further comprises:
    including an integrity protection signature within the PDCP HFN PDU, the RLC HFN PDU or the MAC CE comprising the current hyper frame number.

13. The method of claim 11, wherein transmitting at least the current hyper frame number of the current count value within the control message further comprises:
    including a control PDU sequence number within the PDCP HFN PDU, the RLC HFN PDU or the MAC CE comprising the current hyper frame number to enable retransmission and ciphering of the control message.

14. An apparatus configured for count synchronization in a wireless communication network, comprising:
   a transceiver configured to communicate with a receiving wireless communication device;
   a memory; and
   a processor communicatively coupled to the transceiver and the memory, the processor configured to:
      maintain a respective count value for each packet of a plurality of packets transmitted over a wireless connection with the receiving wireless communication device, each count value comprising a respective hyper frame number and a respective sequence number;
      determine that a signal-to-noise ratio of the wireless connection has dropped below a threshold;
      initiate a count synchronization of a current count value in response to the signal-to-noise ratio dropping below the threshold, the current count value corresponding to the respective count value of a current packet from among the plurality of packets; and
      transmit at least a current hyper frame number of the current count value to the receiving wireless communication device over the wireless connection to synchronize the current count value.

15. The apparatus of claim 14, wherein the processor is further configured to:
   receive the current packet for transmission over the wireless connection;
   include a full count value in a header of the current packet in response to the initiating the count synchronization, wherein the full count value comprises the current hyper frame number and a current sequence number; and
   transmit the current packet comprising the full count value in the header over the wireless connection.

16. The apparatus of claim 14, wherein the processor is further configured to:
   transmit the current hyper frame number and a current sequence number of the current count value over the wireless connection to synchronize the current count value.

17. The apparatus of claim 14, wherein the processor is further configured to:
   receive an out-of-sync flag over the wireless connection in response to transmitting at least the current hyper frame number of the current count value;
   suspend data transmission and reception over the wireless connection in response to receiving the out-of-sync flag;
   transmit a new hyper frame number over the wireless connection to synchronize the current count value, wherein the new hyper frame number exceeds the current hyper frame number; and
   resume data transmission and reception over the wireless connection.

18. The apparatus of claim 14, wherein the processor is further configured to:
   transmit at least the current hyper frame number of the current count value within a control message, the control message comprising a Radio Resource Control (RRC) message, a Packet Data Convergence Protocol (PDCP) HFN packet data unit (PDU), a Radio Link Control (RLC) HFN PDU, or a Media Access Control (MAC) Control Element (CE).

19. The apparatus of claim 18, wherein the processor is further configured to:
   include an integrity protection signature within the PDCP HFN PDU, the RLC HFN PDU or the MAC CE comprising the current hyper frame number.

20. The apparatus of claim 18, wherein the processor is further configured to:
   include a control PDU sequence number within the PDCP HFN PDU, the RLC HFN PDU or the MAC CE comprising the current hyper frame number to enable retransmission and ciphering of the control message.

21. A transmitting wireless communication device configured for count synchronization in a wireless communication network, comprising:
   means for maintaining a respective count value for each packet of a plurality of packets transmitted over a wireless connection with a receiving wireless communication device, each count value comprising a respective hyper frame number and a respective sequence number;
   means for determining that a signal-to-noise ratio of the wireless connection has dropped below a threshold;
   means for transmitting, in response to the signal-to-noise ratio dropping below the threshold, at least a current hyper frame number of a current count value to the receiving wireless communication device over the wireless connection to synchronize the current count value, the current count value corresponding to the respective count value of a current packet from among the plurality of packets.

22. The transmitting wireless communication device of claim 21, further comprising:
   means for receiving the current packet for transmission over the wireless connection;
   means for including a full count value in a header of the current packet in response to the signal-to-noise ratio dropping below the threshold, wherein the full count value comprises the current hyper frame number and a current sequence number; and
   means for transmitting the current packet comprising the full count value in the header over the wireless connection.

23. The transmitting wireless communication device of claim 21, further comprising:
   means for receiving an out-of-sync flag over the wireless connection in response to transmitting at least the current hyper frame number of the current count value;
   means for suspending data transmission and reception over the wireless connection in response to receiving the out-of-sync flag;
   means for transmitting a new hyper frame number over the wireless connection to synchronize the current count value, wherein the new hyper frame number exceeds the current hyper frame number; and
   means for resuming data transmission and reception over the wireless connection.

24. The transmitting wireless communication device of claim 21, further comprising:
   means for transmitting at least the current hyper frame number of the current count value within a control message, the control message comprising a Radio Resource Control (RRC) message, a Packet Data Convergence Protocol (PDCP) HFN packet data unit (PDU), a Radio Link Control (RLC) HFN PDU, or a Media Access Control (MAC) Control Element (CE).

* * * * *